United States Patent
Zhong et al.

(10) Patent No.: US 11,277,339 B2
(45) Date of Patent: Mar. 15, 2022

(54) PACKET FORWARDING METHOD AND APPARATUS

(71) Applicant: HUAWEI TECHNOLOGIES CO., LTD., Guangdong (CN)

(72) Inventors: Qiwen Zhong, Shenzhen (CN); Xiaofei Xu, Beijing (CN); Xiaojun Zhang, Shenzhen (CN); Wenyang Lei, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/809,996

(22) Filed: Mar. 5, 2020

(65) Prior Publication Data

US 2020/0259745 A1    Aug. 13, 2020

Related U.S. Application Data

(63) Continuation of application No. PCT/CN2018/014083, filed on Sep. 5, 2018.

(30) Foreign Application Priority Data

Sep. 7, 2017    (CN) .......................... 201710801752.1

(51) Int. Cl.
*H04L 12/741* (2013.01)
*H04L 12/935* (2013.01)
(Continued)

(52) U.S. Cl.
CPC .............. *H04L 45/74* (2013.01); *H04L 49/30* (2013.01)

(58) Field of Classification Search
CPC ....... H04L 45/74; H04L 45/00; H04L 45/121; H04L 45/50; H04L 49/30; H04L 12/4633; H04L 69/22
See application file for complete search history.

(56) References Cited

U.S. PATENT DOCUMENTS

| | | | |
|---|---|---|---|
| 2007/0067481 A1 | 3/2007 | Sharma et al. | |
| 2009/0002864 A1* | 1/2009 | Duelk | G06F 12/0607 360/48 |

(Continued)

FOREIGN PATENT DOCUMENTS

| | | |
|---|---|---|
| CN | 102098224 A | 6/2011 |
| CN | 102971996 A | 3/2013 |

(Continued)

OTHER PUBLICATIONS

Angelo Germoni et al. Ethernet Burst Transport for Next Generation Optical Metro Networks, IEEE 2011. pp. 151-155.
(Continued)

*Primary Examiner* — Jianye Wu

(74) *Attorney, Agent, or Firm* — Womble Bond Dickinson (US) LLP

(57) ABSTRACT

A packet forwarding method and apparatus pertaining to the field of communications technologies are disclosed. The method includes: determining whether a current to-be-sent target packet is a header packet or a following packet in a burst sequence; when the target packet is the following packet in the burst sequence, obtaining port information of an egress port used to send the burst sequence, where the port information of the egress port is determined and stored when the header packet in the burst sequence is sent, and the burst sequence is a sequence including a plurality of packets that belong to a same service flow; and sending the target packet through the obtained egress port.

20 Claims, 8 Drawing Sheets

(51) Int. Cl.
H04L 45/74 (2022.01)
H04L 49/00 (2022.01)

(56) References Cited

U.S. PATENT DOCUMENTS

| | | |
|---|---|---|
| 2012/0314703 A1 | 12/2012 | Testa et al. |
| 2013/0201826 A1 | 8/2013 | Testa et al. |
| 2014/0044128 A1 | 2/2014 | Suresh et al. |
| 2015/0127797 A1 | 5/2015 | Attar et al. |
| 2016/0308770 A1* | 10/2016 | Zhang .................. H04L 43/028 |
| 2017/0187629 A1 | 6/2017 | Shalev et al. |

FOREIGN PATENT DOCUMENTS

| | | |
|---|---|---|
| CN | 103475537 A | 12/2013 |
| CN | 104506513 A | 4/2015 |
| CN | 104734964 A | 6/2015 |
| CN | 106789695 A | 5/2017 |
| JP | 2009004855 A | 1/2009 |

OTHER PUBLICATIONS

IEEE Std 802.1Qbu™-2016(Amendment to IEEE Std 802.1Q™-2014), IEEE Standard for Local and metropolitan area networks—Bridges and Bridged Networks—Amendment 26: Frame Preemption, 2016. total 52 pages.

IEEE P802.3br™/D3.1, Draft Standard for Ethernet Amendment: Specification and Management Parameters for Interspersing Express Traffic, Apr. 13, 2016. total 56 pages.

* cited by examiner

|  | Code block corresponding to a preamble and an SFD | Code bytes corresponding to the last six bytes of the preamble | | | | | | Code byte corresponding to the start-of-frame delimiter |
|---|---|---|---|---|---|---|---|---|
| CONT. FROM FIG. 3B-1 | 0x78 | 0x55 | 0x55 | 0x55 | 0x55 | 0x55 | 0x55 | 0xd5 |
| | D0 | D1 | D2 | D3 | D4 | D5 | D6 | D7 |
| | D0 | D1 | D2 | D3 | D4 | D5 | D6 | D7 |
| | D0 | D1 | D2 | D3 | D4 | D5 | D6 | D7 |
| | ... | ... | ... | ... | ... | ... | ... | ... |
| | D0 | D1 | D2 | D3 | D4 | D5 | D6 | D7 |
| | D0 | D1 | D2 | D3 | D4 | D5 | D6 | D7 |
| | D0 | D1 | D2 | D3 | D4 | D5 | D6 | D7 |
| | D0 | D1 | D2 | D3 | D4 | D5 | D6 | D7 |
| | 0x87 | | | | | | | |

FIG. 3B-2

PACKET FORWARDING METHOD AND APPARATUS

CROSS-REFERENCE TO RELATED APPLICATIONS

This application is a continuation of International Application No. PCT/CN2018/104083, filed on Sep. 5, 2018, which claims priority to Chinese Patent Application No. 201710801752.1, filed on Sep. 7, 2017. The disclosures of the aforementioned applications are hereby incorporated by reference in their entireties.

TECHNICAL FIELD

The present disclosure relates to the communications field, and in particular, to a packet forwarding method and apparatus.

BACKGROUND

Currently, when receiving a packet, packet forwarding devices such as an Internet Protocol (IP) router, a multiprotocol label switching (MPLS) switch, and an Ethernet switch need to look up a table based on forwarding information carried in the packet, to determine an egress port of the packet. The forwarding information may be a destination IP address, a Media Access Control (MAC) address, an MPLS label, or the like. A capability of a packet forwarding device to look up a table and perform forwarding for all packets one by one is mainly reflected in a packet processing quantity in a unit time (Packet Per Second). As a current network bandwidth requirement and a throughput requirement continuously increase, improving a packet processing capability of the packet forwarding device in a unit time becomes an important challenge for the packet forwarding device. In addition, when the packet forwarding device receives packets and looks up a table and performs forwarding for all the packets one by one, the packet needs to wait in a queue for services of looking up a table and forwarding. Consequently, a forwarding delay of the packet is affected by operations with uncertain time consumption such as looking up a table and queuing.

In related technologies, the packet forwarding device may be used as a transmit end device, or may be used as a receive end device. To improve the packet processing capability of the packet forwarding device in a unit time, in a first method, the transmit end device may connect, by using specially designed packet gaps, a plurality of consecutive packets that belong to a same service flow, to form one burst data unit. Then, the transmit end device may add a burst data unit header in an Ethernet format to the top of the burst data unit, and send the burst data unit to which the burst data unit header is added to the receive end device. After receiving the burst data unit, the receive end device parses the burst data unit header of the burst data unit, and looks up a table and performs forwarding based on forwarding information in the burst data unit header of the burst data unit, so that a quantity of times of looking up a table is reduced to some extent, a system requirement is reduced, and a forwarding rate is improved.

In a second method, bandwidth of a physical port of the packet forwarding device may be divided into a plurality of timeslots, and bandwidth of each timeslot is fixed. For a service flow, the packet forwarding device may construct a rigid pipe according to bandwidth of the service flow by using one or more timeslots. When receiving a packet of the service flow, the packet forwarding device may send the packet of the service flow through the rigid channel.

However, when constructing and sending a burst data unit by using the first method, the transmit end device needs to cache a plurality of consecutive packets that belong to a same service, and then generate a burst data unit header based on the plurality of cached packets, to form the burst data unit and send the burst data unit. In this way, the transmit end device needs relatively large storage space to cache the burst data unit. When the device forwards burst data units one by one, the device needs to cache the burst data units with a large granularity and put the burst data units into a queue to wait for forwarding and processing, and a packet processing pressure is actually converted into a cache pressure of the packet forwarding device. In addition, the burst data units with a large granularity are cached and are put into a queue, a queuing delay of service data is increased, and uncertainty of a delay is increased.

When bandwidth of a physical port is divided into a plurality of timeslots by using the second method, and one service flow is carried by using a rigid pipe including a plurality of timeslots, on the one hand, because bandwidth of the rigid pipe is fixed, adaptability to bandwidth of a service flow is poor. On the other hand, because one service flow is corresponding to one rigid pipe, a quantity of service flows is consistent with a quantity of rigid pipes. Consequently, it is difficult for the packet forwarding device to handle a large quantity of cross-connected rigid pipes in the packet forwarding device that serves as a core node, and a network faces a bottleneck of scalability.

SUMMARY

Embodiments of the present disclosure provide a packet forwarding method and apparatus, to relieve cache pressure on a packet forwarding device for caching a buffer burst data unit, resolve a problem of a queuing delay increase caused by the cache pressure, and resolve a problem of a poor bandwidth adaptability of a rigid pipe to a service flow and a problem of a large quantity of cross-connected rigid pipes.

According to a first aspect, a packet forwarding method is provided, including:

when a current to-be-sent target packet is a following packet in a burst sequence, obtaining port information of an egress port used to send the burst sequence, where the port information of the egress port is determined and stored when a header packet in the burst sequence is sent, and the burst sequence is a sequence including a plurality of packets that belong to a same service flow; and sending the target packet through the egress port corresponding to the obtained port information.

In this embodiment of the present disclosure, whether the target packet is the following packet or the header packet in the burst sequence may be determined. If the target packet is the following packet in the burst sequence, the following packet is sent through the egress port of the burst sequence. Because the egress port of the burst sequence is determined when the header packet in the burst sequence is sent, when sending the target packet, the target packet may be directly sent through the egress port of the burst sequence, and there is no need to perform a complex action of looking up a routing table or looking up another forwarding table again based on forwarding information carried in the target packet, thereby increasing a forwarding rate and reducing a forwarding delay.

In one embodiment, when a target field of the target packet carries a first eigenvalue, the target packet is the header packet in the burst sequence, and when the target field of the target packet carries a second eigenvalue, the target packet is the following packet in the burst sequence; or when a frame gap that is received before the target packet and that is adjacent to the target packet carries a first eigenvalue, the target packet is the header packet in the burst sequence, and when a frame gap that is before and adjacent to the target packet carries a second eigenvalue, the target packet is the following packet in the burst sequence.

In this embodiment of the present disclosure, whether the target packet is the header packet or the following packet in the burst sequence may be distinguished by using different eigenvalues carried in the target field of the target packet. In this way, when it is determined that the target packet is the following packet in the burst sequence, the following packet may be directly sent through the egress port of the burst sequence, so that a conventional operation of looking up a table such as looking up a routing table is avoided, a forwarding rate is accelerated, and a forwarding delay is reduced.

In one embodiment, the obtaining port information of an egress port used to send the burst sequence includes:

when the target packet further includes a feature field, using the feature field as a burst identifier of the burst sequence, and obtaining, from a stored correspondence between a burst identifier and port information, port information corresponding to the burst identifier, where the feature field is used to uniquely identify the burst sequence to which the packet in which the feature field is located belongs; and determining the obtained port information as the port information of the egress port used to send the burst sequence.

In this embodiment of the present disclosure, when the target field of the target packet carries an eigenvalue, the target packet may further carry the feature field, and a burst sequence to which the target packet belongs may be distinguished by using the feature field. In this way, when the target packet is the following packet and carries the feature field, the feature field may be used as the burst identifier of the burst sequence to which the target packet belongs, and the port information of the egress port of the burst sequence is obtained based on the burst identifier. In other words, a case in which one port simultaneously supports a plurality of burst sequences may be implemented by adding a feature field to a target packet.

In one embodiment, the method further includes:

when the target packet is the header packet in the burst sequence and the target packet further includes the feature field, determining an egress port of the target packet based on forwarding information carried in the target packet; and using the feature field as the burst identifier of the burst sequence, and correspondingly storing the burst identifier of the burst sequence and port information of the egress port of the target packet in the correspondence between the burst identifier and the port information.

In this embodiment of the present disclosure, when the target packet is the header packet in the burst sequence, and the target packet further includes the feature field, the egress port of the target packet may be determined based on the forwarding information carried in the target packet. In addition, the feature field of the target packet may be used as the burst identifier of the burst sequence to which the target packet belongs, and the burst identifier and the port information of the egress port are correspondingly stored. In this way, for a subsequent following packet that belongs to the same burst sequence as the target packet, the corresponding port information may be directly found based on the burst identifier, and forwarding is performed through the egress port corresponding to the port information.

In one embodiment, when the target field of the target packet carries a third eigenvalue, the target packet is the header packet in the burst sequence, and the third eigenvalue is used to indicate that the target packet is the header packet in the burst sequence and instruct to update the stored correspondence between the burst identifier and the port information; and the method further includes:

determining an egress port of the target packet based on forwarding information carried in the target packet; and when the target packet further includes the feature field, using the feature field as the burst identifier of the burst sequence, and replacing the port information corresponding to the burst identifier in the correspondence between the burst identifier and the port information with port information of the egress port of the target packet.

In this embodiment of the present disclosure, a quantity of bits of the feature field is limited, and this also means that a quantity of burst identifiers represented by using the feature field is also limited. In this case, if the target field of the target packet carries the third eigenvalue, it indicates that the burst identifier represented by the feature field carried in the target packet is currently being occupied by another burst sequence. In this case, the port information corresponding to the burst identifier carried in the target packet in the currently stored correspondence may be updated based on the third eigenvalue by using the port information of the egress port of the target packet. The third eigenvalue can not only be used to indicate that the target packet is the header packet in the burst sequence, but also be used to instruct to update a corresponding record in the stored correspondence. In this way, a limited quantity of burst identifiers may be reused, to reduce a quantity of records in the stored correspondence, thereby shortening a time for finding an egress port, increasing a forwarding rate, and reducing a forwarding delay.

In one embodiment, the method further includes:

when there is no packet that carries the burst identifier of the burst sequence within preset duration, deleting, from the correspondence between the burst identifier and the port information, a record in which the burst identifier of the burst sequence and the port information of the egress port of the burst sequence are located.

In this embodiment of the present disclosure, the feature field obtained by modifying a specific field in the target packet is used to represent the burst identifier, and a quantity of burst identifiers is limited. Therefore, if one burst identifier is occupied by one burst sequence for a long time, no burst identifier may be used for a subsequent packet in another burst sequence. Based on this, when a packet that carries a burst identifier is not received within preset duration, the burst identifier may be deleted, to release the burst identifier, so that the burst identifier may be reused for a subsequent packet.

In one embodiment, the target field is any field in a preamble, or the target field is any field in a start-of-frame delimiter, or the target field is any field in a frame check field.

In one embodiment, the feature field and the target field are different fields, the feature field is obtained by modifying any field in a preamble, or the feature field is obtained by modifying any field in a start-of-frame delimiter, or the feature field is obtained by modifying any field in a frame check field.

According to a second aspect, a packet forwarding method is provided, including:

obtaining, based on a burst identifier carried in a current to-be-sent target packet, port information of an egress port of a burst sequence to which the target packet belongs, where the burst sequence is a sequence including a plurality of packets that belong to a same service flow; and sending the target packet through the egress port corresponding to the obtained port information.

In this embodiment of the present disclosure, a same burst identifier may be configured for a series of packets that have a same forwarding port, and a packet forwarding device may directly determine an egress port of the target packet based on the burst identifier carried in the packet. Because a quantity of burst identifiers is limited, the packet forwarding device determines the egress port of the target packet based on the burst identifier, so that an operation of looking up a complex routing table or another conventional forwarding table can be effectively avoided, thereby improving throughput efficiency of the packet forwarding device and reducing a forwarding delay.

In one embodiment, the obtaining, based on a burst identifier carried in a current to-be-sent target packet, port information of an egress port of a burst sequence to which the target packet belongs includes:

when the target packet includes a feature field, using the feature field as a burst identifier of the burst sequence to which the target packet belongs, and obtaining, from a stored correspondence between a burst identifier and port information, port information of the egress port corresponding to the burst identifier, or obtaining, from a stored correspondence between ingress port information, a burst identifier, and egress port information, ingress port information of the target packet and port information corresponding to the burst identifier; and determining an egress port corresponding to the obtained port information as the port information of the egress port of the burst sequence.

In this embodiment of the present disclosure, the packet forwarding device may store the correspondence between the burst identifier and the port information, and the correspondence is shared for packets on all ingress ports of the packet forwarding device. In another embodiment, a packet on each ingress port of the packet forwarding device has an independent correspondence. In this way, a same burst identifier may be used for packets on different ingress ports. On this basis, the egress port of the burst sequence to which the target packet belongs may be determined by using an ingress port of the target packet and the burst identifier. In other words, the ingress port information of the target packet and the port information corresponding to the burst identifier may be obtained from the correspondence between the ingress port information, the burst identifier, and the egress port information.

According to a third aspect, a packet forwarding apparatus is provided, and the apparatus has a function of implementing a behavior in the packet forwarding method in the first aspect. The apparatus includes at least one module, and the at least one module is configured to implement the packet forwarding method provided in the first aspect.

According to a fourth aspect, a packet forwarding apparatus is provided, the apparatus has a function of implementing a behavior in the packet forwarding method in the second aspect, the apparatus includes at least one module, and the at least one module is configured to implement the packet forwarding method provided in the second aspect.

According to a fifth aspect, a packet forwarding apparatus is provided, a structure of the apparatus includes a processor and a memory, and the memory is configured to store a program for supporting the packet forwarding apparatus performing the packet forwarding method provided in the first aspect, and store data used to implement the packet forwarding method provided in the first aspect. The processor is configured to execute the program stored in the memory. An operation apparatus of the storage device may further include a communications bus, and the communications bus is configured to establish a connection between the processor and the memory.

According to a sixth aspect, a packet forwarding apparatus is provided, a structure of the apparatus includes a processor and a memory, and the memory is configured to store a program for supporting the packet forwarding apparatus performing the packet forwarding method provided in the second aspect, and store data used to implement the packet forwarding method provided in the second aspect. The processor is configured to execute the program stored in the memory. An operation apparatus of the storage device may further include a communications bus, and the communications bus is configured to establish a connection between the processor and the memory.

According to a seventh aspect, a computer readable storage medium is provided. The computer readable storage medium stores an instruction. When the instruction runs on a computer, the computer performs the packet forwarding method according to the first aspect.

According to an eighth aspect, a computer readable storage medium is provided. The computer readable storage medium stores an instruction. When the instruction runs on a computer, the computer performs the packet forwarding method according to the second aspect.

According to a ninth aspect, a computer program product including an instruction is provided. When the instruction runs on a computer, the computer performs the packet forwarding method according to the first aspect.

According to a tenth aspect, a computer program product including an instruction is provided. When the instruction runs on a computer, the computer performs the packet forwarding method according to the second aspect.

Technical effects obtained in the third aspect, the fifth aspect, the seventh aspect, and the ninth aspect are similar to the technical effects obtained in a corresponding technical means of the first aspect, and technical effects obtained in the fourth aspect, the sixth aspect, the eighth aspect, and the tenth aspect are similar to the technical effects obtained in a corresponding technical means of the second aspect. Details are not described herein again.

The technical solutions provided in the present disclosure bring the following beneficial effects: In the embodiments of the present disclosure, the packet forwarding device may determine whether the target packet is the following packet or the header packet in the burst sequence. If the target packet is the following packet in the burst sequence, the following packet is sent through the egress port of the burst sequence. Because the port information of the egress port of the burst sequence is determined and stored when the header packet in the burst sequence is sent, when sending the target packet, the corresponding egress port may be directly determined based on the stored egress port information to send the target packet, and there is no need to perform a complex action of looking up a routing table or looking up another forwarding table again based on the forwarding information carried in the target packet, thereby increasing a forwarding rate and reducing a forwarding delay.

BRIEF DESCRIPTION OF DRAWINGS

FIG. 3B-1 and FIG. 3B-2 are a schematic diagram of a code block for which 64/66b encoding is used according to an embodiment of the present disclosure;

DESCRIPTION OF EMBODIMENTS

To make the objectives, technical solutions, and advantages of the present disclosure clearer, the following further describes the implementations of the present disclosure in detail with reference to the accompanying drawings.

Figure 1:
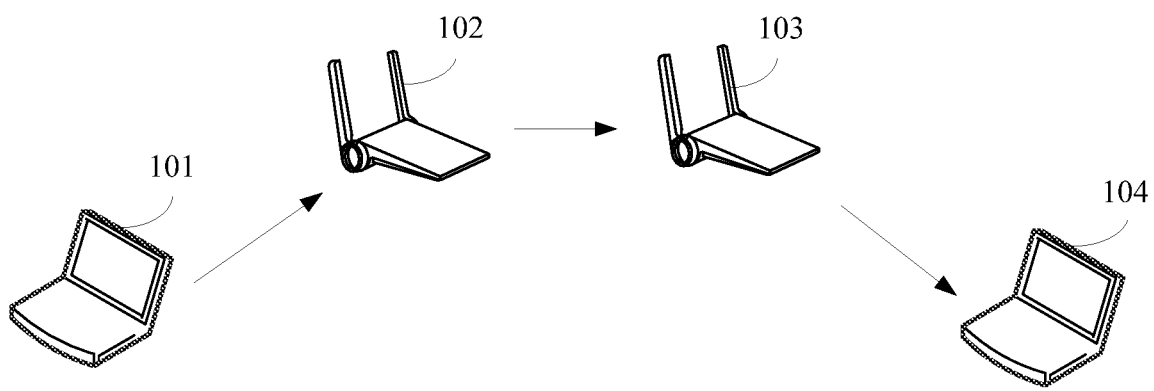
FIG. 1 is a structural diagram of a system of a packet forwarding method according to an embodiment of the present disclosure.

Before the embodiments of the present disclosure are described in detail, a system architecture in the embodiments of the present disclosure is described first. FIG. 1 is an architectural diagram of a system of a packet forwarding method according to an embodiment of the present disclosure. As shown in FIG. 1, the system includes user equipment 101, packet forwarding devices 102 and 103, and user equipment 104. The user equipment 101 may communicate with the packet forwarding device 102, the packet forwarding device 102 may communicate with the packet forwarding device 103, and the packet forwarding device 103 may communicate with the user equipment 104.

Specifically, the user equipment 101 may send a packet to the packet forwarding device 102. After receiving the packet, the packet forwarding device 102 may process the packet, and forward the processed packet to the packet forwarding device 103. The packet forwarding device 103 receives the packet, processes the packet, and forwards the packet to the user equipment 104.

It should be noted that the user equipment 101 and the user equipment 104 may be personal computers, desktop computers, servers, or the like that have an Ethernet interface. The packet forwarding devices 102 and 103 may be, for example, IP routers, MPLS switches, Ethernet switches, Ethernet routers, or other routers that integrate functions of the foregoing switches or routers.

It may be understood that FIG. 1 is merely an example architectural diagram. In actual application, in addition to the user equipment 101 and the user equipment 104 shown in FIG. 1, the system may include a plurality of other user equipments. Certainly, in addition to the packet forwarding devices 102 and 103, the system may further include a plurality of packet forwarding devices. Specifically, a quantity of user equipments and a quantity of packet forwarding devices in the system are not specifically limited in this embodiment of the present disclosure.

In addition, it should be further noted that the user equipment 101 in the foregoing system architecture may be an upstream device of a packet forwarding device in the following embodiment, in other words, the user equipment 101 may mark a target packet. Certainly, the packet forwarding device 102 may also be used as an upstream device of the packet forwarding device 103, in other words, the packet forwarding device 102 may also mark the target packet. Alternatively, the packet forwarding device in the following embodiment may be any packet forwarding device in the system architecture shown in FIG. 1.

Figure 2:
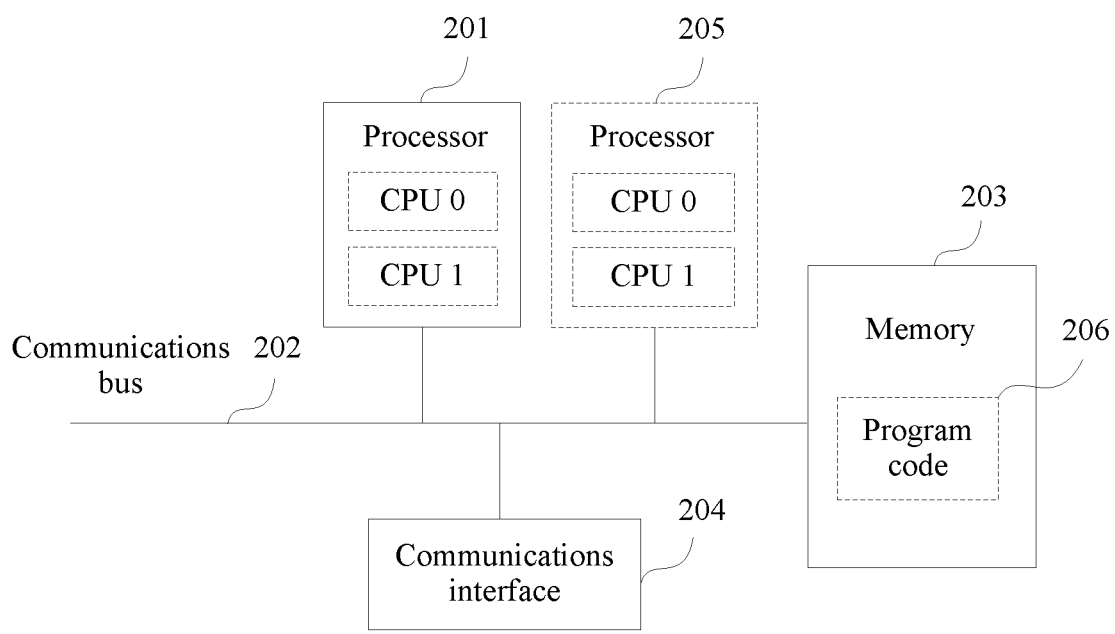
FIG. 2 is a schematic structural diagram of a network device according to an embodiment of the present disclosure.

FIG. 2 is a schematic structural diagram of a network device according to an embodiment of the present disclosure. The packet forwarding device in FIG. 1 may be implemented by using the network device shown in FIG. 2. Referring to FIG. 2, the network device includes at least one processor 201, a communications bus 202, a memory 203, and at least one communications interface 204.

The processor 201 may be a network processing unit (NPU) a general-purpose central processing unit (CPU), a microprocessor, an application-specific integrated circuit (ASIC), or one or more integrated circuits configured to control program execution of the solution in the present disclosure.

The communications bus 202 may include a channel on which information is transmitted between the foregoing components.

The memory 203 may be a read-only memory (ROM) or a static storage device of another type that can store static information and instructions, a random access memory (RAM) or a dynamic storage device of another type that can store information and instructions, or may be an electrically erasable programmable read-only memory (EEPROM), a compact disc read-only memory (CD-ROM) or other compact disk storage, optical disc storage (including a compact disc, a laser disc, an optical disc, a digital versatile disc, a blue-ray disc, and the like), a disk storage medium or another disk storage device, or any other medium that can be used to carry or store expected program code in a command or data structure form and can be accessed by a computer. However, the memory is not limited thereto. The memory 203 may exist independently, and is connected to the processor 201 by using the communications bus 202. Alternatively, the memory 203 may be integrated with the processor 201.

The communications interface 204 may be any apparatus like a transceiver, and is configured to communicate with another device or communications network, such as an Ethernet, a radio access network (RAN), or a wireless local area network (WLAN).

During specific implementation, in an embodiment, the processor 201 may include one or more CPUs, such as a CPU 0 and a CPU 1 shown in FIG. 2.

During specific implementation, in an embodiment, the network device may include a plurality of processors, for example, the processor 201 and a processor 205 shown in FIG. 2. Each of the processors may be a single-core (single-CPU) processor or may be a multi-core (multi-CPU) processor. The processor herein may be one or more devices, circuits, and/or processing cores used to process data (such as a computer program instruction).

The memory 203 is configured to store program code used to execute the solution in the present disclosure, and the processor 201 controls the execution. The processor 201 is configured to execute program code 206 stored in the memory 203. The program code 206 may include one or more software modules. The network device may implement, by using the processor 201 and the one or more software modules in the program code 206 in the memory 203, a packet forwarding method in the following embodiment shown in FIG. 3A to FIG. 3C, FIG. 4, or FIG. 5A to FIG. 5B.

The following describes in detail the packet sending method provided in the embodiments of the present disclosure.

In the packet sending method provided in the embodiments of the present disclosure, a packet forwarding device identifies and forwards a packet by using a mark made by an upstream device for the packet. Therefore, before a method for forwarding the packet by the packet forwarding device based on mark information is described, a specific process in which the upstream device of the packet forwarding device marks the packet is first described.

In the embodiments of the present disclosure, the upstream device of the packet forwarding device may mark a plurality of packets that belong to a same service flow, and send the plurality of marked packets. The plurality of packets form one burst sequence. The packet forwarding device may distinguish between a header packet and a following packet in the burst sequence by using marks made by the upstream device. The upstream device of the packet forwarding device may be user equipment. The system architecture shown in FIG. 1 is used as an example, and the upstream device may be the user equipment 101. Certainly, the upstream device of the packet forwarding device may also be another packet forwarding device that can communicate with the current packet forwarding device. Certainly, after determining an egress port of a to-be-sent target packet by using mark information, the current packet forwarding device may re-mark the target packet by using the following method. In other words, in the embodiments of the present disclosure, a packet may be marked by user equipment that sends the packet, and may further be marked by a packet forwarding device that forwards the packet, and the packet may be marked only once in a packet transmission process, or may be re-marked a plurality of times by a plurality of different devices.

It should be noted that the upstream device of the packet forwarding device may mark a target field of each packet, or may mark a field in a frame gap that is before and adjacent to each packet. In this case, the frame gap may be used as an extension part of the packet that follows and adjacent to the frame gap, to distinguish between a header packet and a following packet in a burst sequence. Further, the upstream device of the packet forwarding device may further modify a specific field other than the target field in each packet, to obtain a feature field. In this case, the target field is used to indicate whether the packet is a packet in the burst sequence and whether the packet is the header packet or the following packet in the burst sequence, and the feature field is used to further indicate the burst sequence to which the packet specifically belongs, to distinguish between packets that belong to different burst sequences, so that one egress port can support sending of a plurality of burst sequences.

Specifically, for a header packet in a burst sequence, the upstream device of the packet forwarding device may not mark the header packet, but process the header packet in a conventional packet processing manner, and sends the processed packet to the current packet forwarding device. In this case, for several adjacent following packets following the header packet, the upstream device may add a second eigenvalue to a target field of the following packet, to notify the packet forwarding device receiving the packet that the packet is a following packet. In this case, an original value of a target field of the header packet may also be considered as a first eigenvalue. Herein, identification of the header packet depends on a following packet adjacent to the header packet. For ease of description, the marking manner may be referred to as an implicit marking manner. Certainly, the upstream device may also add a first eigenvalue or a third eigenvalue to the target field of the header packet, to clearly mark the packet as the header packet in an explicit marking manner; and add another second eigenvalue different from an eigenvalue of the header packet to the target field corresponding to the subsequent following packet, to indicate that the subsequent packet is a following packet. In this case, the following packet may not be adjacent to the header packet. In other words, in this case, another conventional independent packet may be inserted between the header packet and the following packet in the header packet. Further, if a target field of a header packet and a target field of a following packet in each of the plurality of burst sequences each have a unique eigenvalue (for example, there are n burst sequences, n eigenvalues are used for target fields of header packets, n eigenvalues are used for target fields of following packets, and there are 2n eigenvalues in total), the following packet may not be adjacent to the header packet. In other words, in this case, a packet in another burst sequence or a conventional independent packet that does not belong to any burst sequence may be inserted between the header packet and the following packet in the header packet. The target field may be any field in a preamble of a packet, or may be any field in a start-of-frame delimiter (SFD), or may be any field in a frame check field. It should be further noted that the preamble of the packet includes seven bytes, and the start-of-frame delimiter is one byte.

Figure 3A:
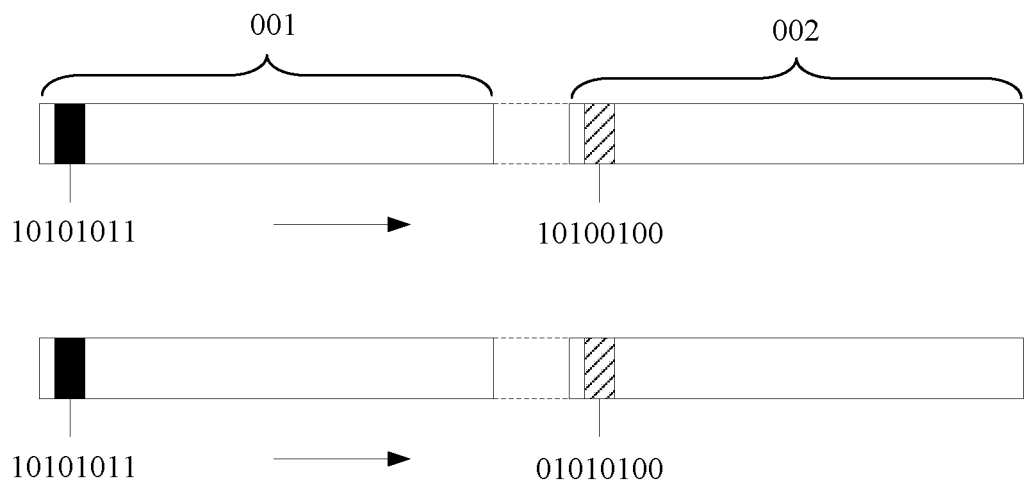
FIG. 3A is a schematic diagram of marking a packet according to an example of this embodiment of the present disclosure.

For example, FIG. 3A is a schematic diagram of marking a packet according to an example of this embodiment of the present disclosure. As shown in FIG. 3A, no mark may be made on a header packet 001, and for a following packet 002 that follows and adjacent to the header packet 001, a new eigenvalue different from a value of a conventional start-of-frame delimiter may be added to a field in which the conventional start-of-frame delimiter of the packet 002 is located, in other words, a value of the field in which the start-of-frame delimiter of the packet 002 is located is changed to the new eigenvalue different from the value of the conventional start-of-frame delimiter. In this case, the field in which the start-of-frame delimiter of the packet 002 is located is a target field. In this case, the new eigenvalue that is different from the value of the start-of-frame delimiter and that is obtained through modification may be referred to as a start-of-frame delimiter of the burst following packet, to mark the packet 002 as a following packet in the packet 001 that is before and adjacent to the packet 002. A plurality of following packets that follow and adjacent to the packet 002, the packet 001, and the packet 002 form a burst sequence. The packet 001 is a header packet in the burst sequence, and both the packet 002 and the plurality of following packets adjacent to the packet 002 are following packets in the burst sequence. In this case, a target field of the following packet and a target field of the header packet include different eigenvalues for distinguishing. Specifically, that the new eigenvalue is added to the field in which the start-of-frame delimiter of the packet 002 is located may be specifically as follows: Several bits or a plurality of bits in the value of the conventional start-of-frame delimiter of the target field may be modified. For example, a binary value of a conventional start-of-frame delimiter of an unmodified Ethernet packet is 0b10101011. As shown in an upper diagram in FIG. 3A, an inverse operation is performed on the last four bits of the value of the conventional start-of-frame delimiter, and the binary value is modified to 0b10100100. Alternatively, as shown in a lower diagram in FIG. 3A, an inverse operation is performed on all bits of the value of the conventional start-of-frame delimiter, to obtain a modified binary value 0b01010100 of the start-of-frame delimiter of the following packet.

FIG. 3A is merely an example of marking according to an embodiment of the present disclosure. In actual application, not only a value of a conventional start-of-frame delimiter of a field in which the conventional start-of-frame delimiter of a packet is located may be modified by using the foregoing method, but also a byte in seven bytes included in a preamble may be modified as a target field, or a field in a frame gap before the packet may be modified, to implement marking for whether the packet belongs to a burst sequence and for whether the packet is specifically a following packet or a header packet.

Further, to distinguish, on a same port, a burst sequence that is in the n different burst sequences and to which the packet belongs, and avoid using 2n eigenvalues for target fields, the upstream device performs header packet marking on a target field of a packet by using a new target field eigenvalue, and performs following packet marking on a target field of a packet by using another different new target field eigenvalue, that a specific field other than the target field in the packet is used as a feature field may be further agreed on, and the feature field is used to carry a burst identifier (Burst ID) of a burst sequence that is in the n different burst sequences and to which the packet belongs, to distinguish between packets of different burst sequences. The feature field may be a field in which no specific information but limited marking information is carried, for example, all or a part of any of the last six bytes in the preamble is modified to the feature field carrying the burst identifier Burst ID. Specifically, when the burst identifier Burst ID is one byte, n=256 burst sequences may be distinguished. When the burst identifier Burst ID is a half of the byte, n=16 burst sequences may be distinguished. In this way, for a header packet, two eigenvalues [an eigenvalue of a target field of the header packet, a burst ID] are used to indicate that the packet is a header packet and indicate a specific burst sequence that is in the n burst sequences and to which the packet belongs; for a following packet, two eigenvalues [an eigenvalue of a target field of the following packet, a burst ID] are used to indicate that the packet is a following packet and indicate a specific burst sequence that is in the n burst sequences and to which the packet belongs. It should be noted that for each packet, two eigenvalues need to be used to indicate whether the packet is a header packet or a following packet and indicate a burst sequence to which the packet belongs, and therefore, a target field and a feature field that respectively carry the two eigenvalues are different fields. In order to distinguish the packet from a conventional packet, values of [the target field, the feature field] need to be different from original values of [a target field, a feature field] in the conventional packet. For example, if the target field is a field in which a conventional start-of-frame delimiter is located, the feature field may be a field that includes any part of or all of 48 bits of the last six bytes in a preamble of the packet. Alternatively, [the target field, the feature field] may be some or all of total 56 bits that include the 48 bits of the last six bytes in the preamble of the packet and the field (one byte, namely, eight bits) in which the conventional start-of-frame delimiter is located. If a field in which a non-conventional start-of-frame delimiter is located is selected as the target field, a part or all of the field in which the conventional start-of-frame delimiter is located may be used as the feature field.

For example, for a following packet in a burst sequence, the upstream device may perform, based on an agreement, following packet marking on a last byte in seven bytes included in a preamble of the packet, to indicate that the packet is a following packet. In addition, a start-of-frame delimiter in the packet may be modified to obtain a feature field. The feature field is used as a burst identifier, to indicate a burst sequence to which the packet belongs. Alternatively, a start-of-frame delimiter of the packet may be modified to a start-of-frame delimiter of a burst following packet based on an agreement, to indicate that the packet is a following packet. A last byte in seven bytes included in a preamble of the packet is modified to obtain a feature field. The feature field is used as a burst identifier, to indicate a burst sequence to which the packet belongs.

It should be noted that when burst sequences to which packets belong are distinguished by using feature fields, a quantity of bits included in the feature field limits a quantity of burst sequences supported by an egress port that is of the upstream device and that is used to send a packet. For example, it is agreed that the feature field includes four bits. In this case, the four-bit feature field may represent 16 different values: 0 to 15, and the 16 different values may be used as identifiers of a maximum of 16 different valid burst sequences. In other words, 16 parallel burst sequences may be supported by using the 16 burst identifiers. The upstream device and the downstream packet device of the upstream device need to agree on and allocate some or all of the 16 burst identifiers, to mark a maximum of 16 valid burst sequences. After the 16 burst identifiers are allocated, when the upstream device and the downstream device need to agree on a burst identifier for a new burst sequence, in this case, the upstream device and the downstream device can only recycle one of the 16 burst identifiers previously allocated to other burst sequences, and redistribute the burst identifier to the new burst sequence.

An implementation of recycling and redistributing the burst identifier may be as follows: A burst identifier that needs to be recycled is added to a feature field of a header packet in the new burst sequence, so that the downstream packet forwarding device that receives the header packet determines forwarding processing and an egress port of the new burst sequence based on the header packet in the new burst sequence, and the burst identifier is subsequently used by the new burst sequence. Alternatively, after a specific burst sequence corresponding to the foregoing 16 burst identifiers is sent and a burst identifier of the burst sequence is released, the upstream device may allocate the released burst identifier to the new burst sequence. In this case, a timeout mechanism may be introduced, to be specific, when packet transmission of the burst sequence corresponding to the burst identifier is not performed between the upstream device and the downstream device within a time exceeding a preset time T, the burst identifier is recycled. Finally, it should be clarified that allocation of burst identifiers may be statically configured and agreed on between the upstream device and the downstream device, and may be valid until configuration and agreement are performed again. In this case, the timeout mechanism is not used, and forwarding processing and an egress port of a burst corresponding to a burst identifier are not updated by using a header packet.

Further, to ensure reliability of the burst identifier, the upstream device may use a specified quantity of bits in the feature field as information check bits. For example, for an eight-bit feature field, the first seven bits may be used as a burst identifier, and a last bit is used as an information check bit. Specifically, a value of the information check bit may be obtained through a parity check. For example, when a quantity of bits whose values are 1 in the first seven bits is an odd number, the last bit is 1. Otherwise, if the quantity of bits is an even number, the last bit is 0. For another example, for an eight-bit feature field, the first four bits may be used as a burst identifier, and the last four bits are used as information check bits. Values of the check information bits of the last four bits may be obtained through calculation by using a CRC-4 cyclic redundancy check formula $x4+x+1$. For the downstream packet forwarding device, when check of the burst identifier fails, the packet is processed based on a conventional packet processing manner, to be specific, the packet is cached and waits in a queue based on forwarding information carried in the packet, and is forwarded by looking up a forwarding table such as a routing table.

In addition to the foregoing several methods for marking a packet, the upstream device may add a linked-list pointer to a feature field of a following packet for marking and distinguishing. The pointer is used to indicate a quantity of other packets between the following packet and a previous packet that belongs to a same burst sequence as the current packet. For this marking manner, when receiving a header packet or any following packet in a burst sequence, the downstream packet forwarding device may determine a next following packet in the burst sequence based on a pointer carried in the packet, and further determine an egress port of the next following packet for sending the next following packet. In addition, a sequence number of a current packet, a sequence number of a previous packet, and a sequence number of a next packet are added to feature fields of all packets that belong to burst sequences and that are on a same port. The sequence number is increased by 1 as a quantity of packets in a burst sequence increases. In this case, a series of packets of a burst sequence may be specifically determined by using a linked-list pointer connection relationship of a series of [a sequence number of a previous packet, a sequence number of a current packet, and a sequence number of a next packet]. For example, sequence numbers of a plurality of packets that belong to a plurality of burst sequences are . . . , 4, 5, 6, 7, 8, 9, 10, . . . . Packets 4, 7, and 10 belong to a same burst sequence, and feature fields of the packets 4, 7, and 10 may be respectively [Null, 4, and 7], [4, 7, and 10], [7, 10, and Null]. A sequence number of a previous packet of the packet 4 is null=0, to be specific, no packet is before the packet 4, and the packet 4 is a header packet. The feature field of the packet 7 explicitly indicates that a previous packet and a next packet of the packet 7 are respectively the packet 4 and the packet 10 in the burst sequence to which the packet 7 belongs. A next packet of the packet 10 whose feature field is [7,10, Null] is null=0, to be specific, no packet follows the packet 10, and the burst sequence ends. Packets 5, 6, 8, 9, . . . are packets in another burst sequence. For example, when the four packets belong to a same burst sequence, possible marks may be [2, 5, 6], [5, 6, 8], [6, 8, 9], and [8, 9, 12]. If each sequence number is defined as one byte, the feature field needs three bytes. The sequence numbers are periodically repeated from 0 to 255. Other marking methods are not enumerated herein.

Finally, it should be highlighted that in a high-speed Ethernet interface, a 64/66b code block is widely used for Ethernet packet transmission. In a flexible Ethernet (FlexE) technology, time division multiplexing (TDM) is performed, based on the 64/66b code block, on a physical interface to obtain several logical ports with fixed bandwidth through division. Further, a logical port crossing a plurality of network nodes may be obtained by introducing a cross connection technology to these logical ports with fixed bandwidth. Therefore, when a packet is processed in a form of a code block, an upstream device may perform marking on the code block in the foregoing manners, to reduce coding and decoding processing of a packet forwarding device, and effectively reduce complexity and a forwarding delay. To be specific, the upstream device performs marking (including the foregoing various marking manners such as adding a corresponding eigenvalue or a pointer) on a preamble or a start-of-frame delimiter of the packet or a frame gap before the packet, and for a representation form, the marking may be directly performed on a target field and a feature field. Certainly, on a port for which 64/66b encoding is used, the marking may be directly performed on a target field and/or a feature field in a code block corresponding to the preamble, the start-of-frame delimiter, or the frame gap, and the downstream forwarding device may directly perform identification on the code block. In other words, marking performed based on a decoded byte bit field is equivalent to marking performed based on a field in a code block. The code block includes a 64/66b code block or another code block, for example, n/mb code blocks such as an 8/10b code block, a 128/130b code block, and a 512/514b code block that are in different encoding forms, where n indicates a quantity of payload bits in each code block, m indicates a total quantity of bits in each code block, n and m are positive integers, and m>n. A specific encoding manner used for the code block is not limited in the present disclosure.

Figures 1, 3B:
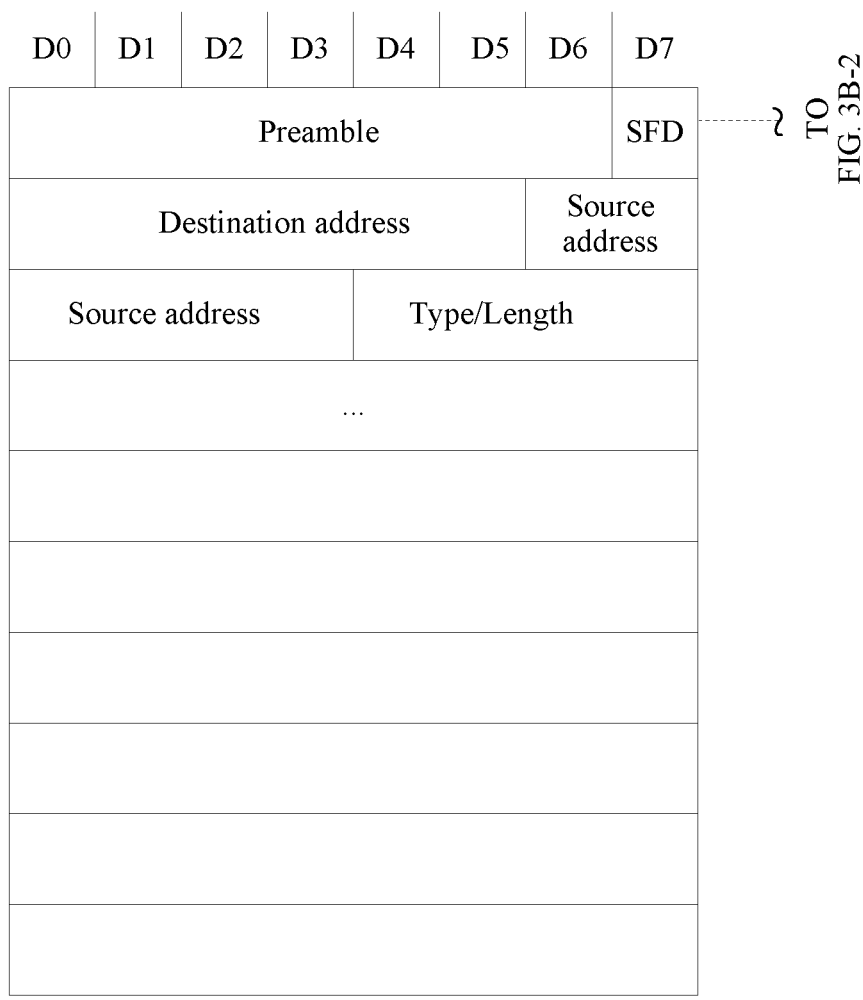

Specifically, as shown in FIG. 3B-1 and FIG. 3B-2, FIG. 3B-1 and FIG. 3B-2 are a schematic diagram of a code block for which 64/66b encoding is used according to an embodiment of the present disclosure. FIG. 3B-1 shows a packet in a byte form, where the first seven bytes are a preamble, a start-of-frame delimiter is located after the preamble, and valid data information of the packet such as a destination address, a source address, and packet content is located after the start-of-frame delimiter. Dn in the figure is used to represent one byte. FIG. 3B-2 shows a corresponding 64/66b code block. As shown in a first row in FIG. 3B-2, when 64/66b encoding is performed, after a first byte of a preamble is replaced with an /S/character that is used to represent a start, 64/66b encoding is performed on each group including eight bytes, and every eight bytes are encoded into one code block, to obtain several 64/66b code blocks in total, and eight bytes including the seven bytes of the preamble and one byte of a start-of-frame delimiter are corresponding to one code block. A binary value 0b10 of a two-bit synchronization header of the code block and a binary value 0b00011110 (a hexadecimal value 0x78) of a first byte indicating a code block type should not be modified, an upstream device may perform burst marking on any part of a total of 48 bits in the last six bytes (represented by a hexadecimal value 0x55 in the figure) corresponding to the preamble or a seventh byte, namely, the byte (including eight bits, and represented by a hexadecimal value 0x5d in the figure) corresponding to the start-of-frame delimiter, to indicate whether a packet is a header packet or a following packet in a burst sequence. Specifically, the upstream device and a downstream device may agree that burst marking is performed on a last byte of the code block in which the start-of-frame delimiter is located, namely, an original field in which the start-of-frame delimiter is located, to indicate whether the packet is the header packet or the following packet in the burst sequence; and a burst identifier is added to a last byte field of the preamble in the same code block, to distinguish between packets of different burst sequences. Alternatively, the upstream device and a downstream device may agree that burst marking is performed on a last but one byte of the code block corresponding to the preamble, namely, a last byte field of the preamble, to indicate whether the packet is the following packet or the header packet, and a burst identifier is added to a last byte of the code block corresponding to an original field in which the start-of-frame delimiter is located, to distinguish between packets of different burst sequences.

It should be noted that the foregoing description is merely an example according to an embodiment of the present disclosure, and does not constitute a limitation on the embodiments of the present disclosure. In actual application, marking can perform not only on the code block corresponding to the preamble and the start-of-frame delimiter, but also on a code block corresponding to a frame gap. For a specific marking method, refer to the method described above. Principles are the same, and details are not described in the embodiments of the present disclosure.

In one embodiment, a next packet forwarding device adjacent to the upstream device may communicate and negotiate with the upstream device, to agree on a specific manner of marking a packet by the upstream device. Therefore, when the upstream device sends the marked packet to the next packet forwarding device, the next packet forwarding device may identify and forward the received packet in the marking manner agreed on through negotiation.

Figure 3C:
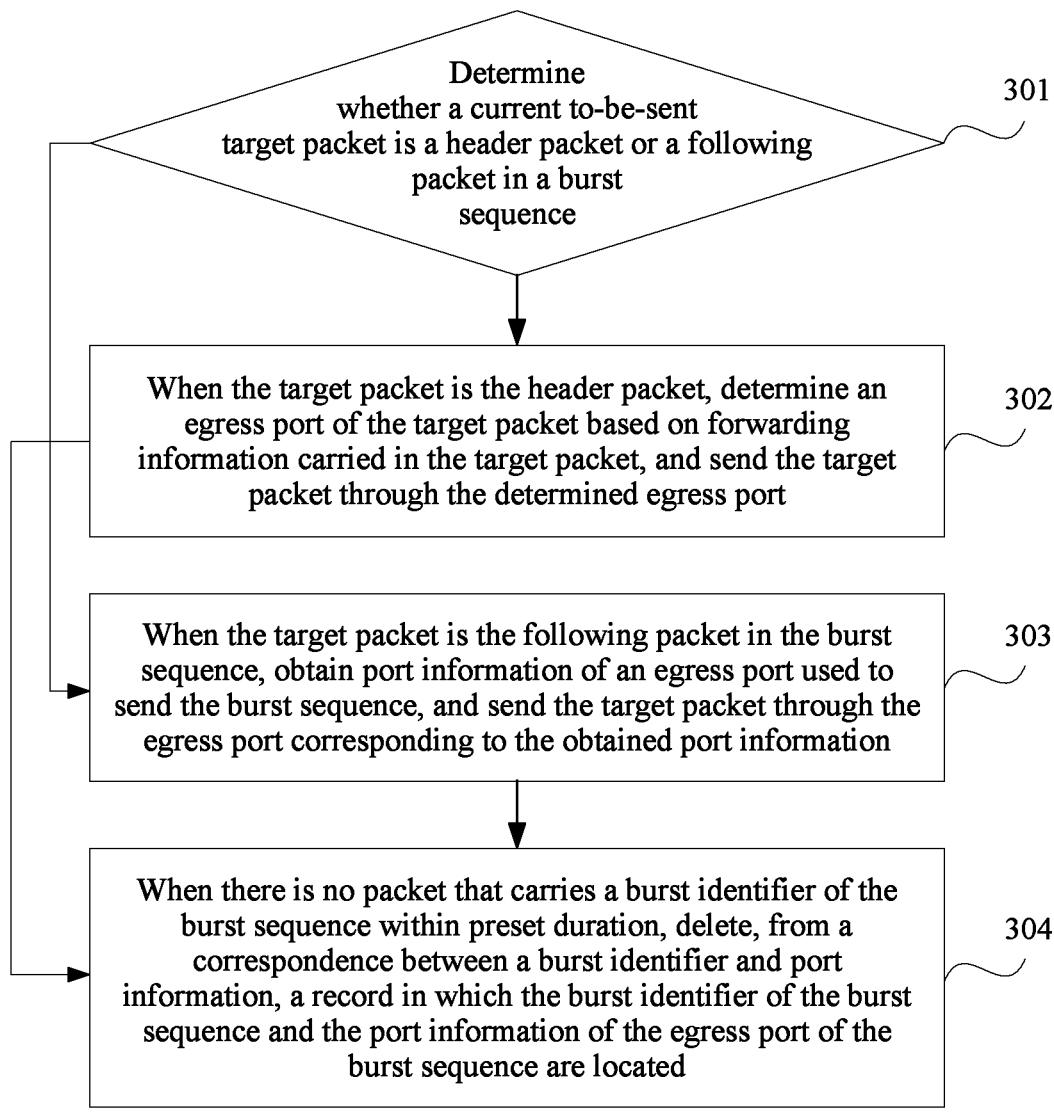
FIG. 3C is a flowchart of a packet forwarding method according to an embodiment of the present disclosure.

Based on the foregoing descriptions, because the upstream device of the packet forwarding device may mark a plurality of packets that belong to a same service flow, for a current to-be-sent target packet, the downstream packet forwarding device may forward the target packet by using a packet sending method provided in an embodiment shown in FIG. 3C. To be specific, after a target field and a feature field of a packet are marked in the marking manner described above, the marked packet may be identified and forwarded by using related operations described in the embodiment in FIG. 3C.

FIG. 3C is a flowchart of a packet forwarding method according to an embodiment of the present disclosure. The method may be applied to a packet forwarding device shown in FIG. 1. Referring to FIG. 3C, the method includes the following operations.

Operation 301: Determine whether a current to-be-sent target packet is a header packet or a following packet in a burst sequence.

Based on the foregoing descriptions, the header packet and the following packet in the burst sequence are distinguished by marking a target field or a frame gap, and for a header packet that carries a reused burst identifier, a marking manner of a target field of the header packet is different from that of another header packet. Therefore, for the foregoing several cases, the packet forwarding device may determine, in different manners, whether the target packet is the header packet or the following packet in the burst sequence. The burst sequence is a sequence including a plurality of packets that belong to a same service flow. The plurality of packets have a same network forwarding behavior.

In one embodiment, when the target field of the target packet carries a first eigenvalue, it is determined that the target packet is the header packet in the burst sequence; and when the target field of the target packet carries a second eigenvalue, it is determined that the target packet is the following packet in the burst sequence. The first eigenvalue may be an original value of the target field, or may be an eigenvalue that is obtained through negotiation and that is specially used to indicate that the packet is a header packet. The second eigenvalue may be any value different from the original value of the target field and the first eigenvalue. Certainly, the second eigenvalue may be an eigenvalue that is obtained through negotiation and that is specially used to indicate that the packet is a following packet. Specifically, for a specific eigenvalue of the first eigenvalue and a specific eigenvalue of the second eigenvalue, refer to the foregoing related descriptions of marking a target field of a packet. Details are not described in this embodiment of the present disclosure.

It should be noted that if an egress port that is of an upstream device and that is used to send the target packet supports only one burst sequence, the target packet carries only the first eigenvalue or the second eigenvalue, to distinguish a header packet and a following packet in the current burst sequence. If an egress port that is used to send the target packet supports sending of a plurality of burst sequences, in this case, the target packet not only carries the first eigenvalue or the second eigenvalue, but also may carry a feature field. The feature field is obtained by modifying a field other than the target field in the target packet, and the feature field is a burst identifier of the burst sequence to which the target packet belongs.

In another embodiment, because the upstream device may allocate burst identifiers that are previously used and are not released to header packets of some burst sequences, in this case, such header packets need to be distinguished from another header packet, and the header packets each carry a third eigenvalue and a feature field. In this case, when the packet forwarding device determines that the target field of the target packet carries the third eigenvalue or a frame gap before the target packet carries the third eigenvalue, the target packet may be determined as the header packet in the burst sequence.

In another embodiment, the upstream device may mark a frame gap before the target packet. In this case, when a frame gap that is received before the target packet and that is adjacent to the target packet carries a first eigenvalue, it is determined that the target packet is the header packet in the burst sequence, and when a frame gap that is before and adjacent to the target packet carries a second eigenvalue, it is determined that the target packet is the following packet in the burst sequence.

In another embodiment, the upstream device may mark the packet by using encoding bytes corresponding to the target field and a feature field in a code block, to be specific, the first eigenvalue, the second eigenvalue, or the third eigenvalue may be added to the encoding byte corresponding to the target field in the code block, and a burst identifier is added to the encoding byte corresponding to the feature field in the code block. Both the first eigenvalue and the third eigenvalue are eigenvalues used to indicate that the packet is the header packet, and the second eigenvalue is an eigenvalue used to indicate that the packet is the following packet. For details, refer to related descriptions in the foregoing packet marking process. Details are not described in this embodiment of the present disclosure. In this case, the packet forwarding device may detect whether there is a corresponding mark on the 64/66b code block, to determine whether the target packet is the following packet or the header packet.

In another embodiment, when the target packet includes a feature field, and the feature field includes an information check bit, the packet forwarding device may verify a value of the information check bit. If the verification succeeds, it may be determined, based on an eigenvalue carried in the target field of the target packet, whether the target packet is the header packet or the following packet in the burst sequence. If the verification fails, the target packet is forwarded in a conventional packet processing manner by looking up a routing table.

When determining that the target packet is the header packet, the packet forwarding device may send the target packet by using operation 302. When determining that the target packet is the following packet, the packet forwarding device may send the target packet by using operation 303 and operation 304.

Operation 302: When the target packet is the header packet, determine an egress port of the target packet based on forwarding information carried in the target packet, and send the target packet through the determined egress port.

When the target field of the target packet carries the first eigenvalue or the third eigenvalue, or the frame gap before the target packet carries the first eigenvalue or the third eigenvalue, the packet forwarding device may determine, based on the forwarding information carried in the target packet, the egress port that is used to send the target packet, and send the target packet through the determined egress port. The forwarding information may be information such as a forwarding address or a label carried in the target packet. For example, the forwarding information may be a destination IP address, a MAC address, a source address and a destination address in an Ethernet packet, an MPLS label, or the like. Specifically, the packet forwarding device may determine, based on the forwarding information carried in the target packet, the egress port of the target packet in a conventional packet processing manner by looking up a routing table or an MPLS forwarding table.

Further, after the packet forwarding device determines the egress port of the target packet, because the target packet is the header packet, the packet forwarding device may store port information of the egress port of the target packet, so that a packet that belongs to the same burst sequence as the header packet and that needs to be subsequently sent can be forwarded without looking up the routing table.

If the target field of the target packet carries the first eigenvalue and the target packet does not include the feature field, it indicates that an ingress port that is used to receive the target packet supports only one burst sequence. In this case, the packet forwarding device may store the port information of the egress port of the target packet, so that a following packet immediately received after the target packet may be directly forwarded through the egress port of the target packet.

If the target field of the target packet carries the first eigenvalue and the target packet further includes the feature field, it indicates that an ingress port that is used to receive the target packet may support a plurality of burst sequences. In this case, if burst identifiers are sufficient, the upstream device allocates unique burst identifiers to packets sent on all egress ports of the upstream device, in other words, the burst identifiers are shared for all the egress ports of the upstream device. Then, the packet forwarding device may use the feature field of the target packet as the burst identifier of the burst sequence to which the target packet belongs, use the egress ports of the target packet as an egress ports of the burst sequence to which the target packet belongs, and correspondingly store the burst identifier and the port information of the egress port in a correspondence between a burst identifier and port information. In this case, the correspondence is shared for all ingress ports of the packet forwarding device, that is, regardless of which ingress port the to-be-sent packet is received from, the correspondence may be directly searched for the corresponding port information according to the feature field in the packet.

For example, the upstream device has 16 burst identifiers in total, and all the egress ports of the upstream device share the 16 burst identifiers. In this way, the upstream device allocates a burst identifier 1 to a burst sequence on an egress port 1. Before the 16 burst identifiers are allocated, the burst identifier 1 is no longer allocated to another burst sequence. In this case, when the packet forwarding device receives header packets of these burst sequences, because burst identifiers of the burst sequences are unique, there is no need to store ingress ports of the burst sequences, and the burst sequences may be distinguished by storing only the burst identifiers and corresponding egress ports.

In one embodiment, if the upstream device separately allocates a burst identifier to each egress port, for example, 16 burst identifiers may be used by each egress port, because packets received by the packet forwarding device from different ingress ports may carry a same burst identifier, the packet forwarding device may establish an independent correspondence for each ingress port. To be specific, the packet forwarding device may use the feature field of the target packet as the burst identifier of the burst sequence to which the target packet belongs, use the egress port of the target packet as the egress port of the burst sequence to which the target packet belongs, and correspondingly store port information of the ingress port used to receive the target packet, the burst identifier, and the port information of the egress port in a correspondence between ingress port information, a burst identifier, and egress port information. In this way, when obtaining a forwarding egress port of a to-be-sent packet, a specific ingress port from which the to-be-sent packet is received is obtained by correspondingly searching for a burst identifier and egress port information that are corresponding to information about the ingress port.

If the target field of the target packet carries the third eigenvalue and the target packet includes the feature field, in this case, the feature field of the target packet may be used as the burst identifier of the burst sequence to which the target packet belongs. It can be learned from the third eigenvalue of the target packet that the burst identifier is a burst identifier that is being used by another burst sequence before the target packet, to be specific, a correspondence currently stored by the packet forwarding device includes the burst identifier and port information corresponding to the burst identifier, and in this case, the port information corresponding to the burst identifier is port information of an egress port of the another burst sequence that is using the burst identifier. In this case, the packet forwarding device may update, based on the third eigenvalue by using the port information of the egress port of the target packet, the currently stored port information corresponding to the burst identifier. Specifically, the packet forwarding device may first determine the egress port of the target packet based on the forwarding information carried in the target packet, and use the egress port of the target packet as an egress port of the burst sequence to which the target packet belongs. Then, the packet forwarding device may replace the port information corresponding to the burst identifier in the stored correspondence between the burst identifier and the port information with the port information of the egress port of the target packet. Certainly, if the stored correspondence is a correspondence between ingress port information, a burst identifier, and egress port information, the packet forwarding device may replace ingress port information of the target packet and the port information corresponding to the burst identifier in the stored correspondence between the ingress port information, the burst identifier, and the egress port information with the port information of the egress port of the target packet.

It should be noted that, it can be learned from the foregoing descriptions that in this operation, both the first eigenvalue and the third eigenvalue may be used to indicate that the target packet is a header packet. In addition, the first eigenvalue may be further used to instruct the packet forwarding device to create a corresponding record between the burst identifier and the port information of the burst sequence, and the third eigenvalue may be used to instruct the packet forwarding device to update the port information in an existing record of the burst identifier and the port information.

Operation 303: When the target packet is the following packet in the burst sequence, obtain port information of an egress port used to send the burst sequence, and send the target packet through the egress port corresponding to the obtained port information.

When the target field of the target packet carries the second eigenvalue or the frame gap before the target packet carries the second eigenvalue, and the target packet does not include the feature field, it indicates that an ingress port used to receive the target packet supports only one burst sequence. In this case, the packet forwarding device may obtain port information of an egress port of a header packet that is received most recently on the ingress port, and use the egress port of the header packet as the egress port of the burst sequence to which the header packet and the target packet belong. Alternatively, the packet forwarding device may directly send the target packet through an egress port of a previous packet received on the ingress port.

In this embodiment of the present disclosure, when one port supports one burst sequence, because the packet forwarding device may forward the following packet following the previous packet or the recent header packet, the packet forwarding device does not need to cache a plurality of packets to construct a burst header, to better adapt to a requirement of a low-latency network. In addition, in this embodiment of the present disclosure, when one port supports only one burst sequence, the burst sequence may be interrupted by another burst sequence at any time. For example, a header packet is followed by three following packets. If a packet following the third following packet is a packet in another service flow, the packet may be used as a header packet in a next burst sequence. In this case, a current burst sequence is interrupted. In this way, a problem that a relatively long burst sequence occupies one egress port for a long time for sending is avoided. In addition, in this embodiment of the present disclosure, if the packet forwarding device does not support packet marking and identification, the packet forwarding device may also process the to-be-sent target packet in a conventional packet processing manner such as looking up a routing table. In other words, the method provided in this embodiment of the present disclosure may further be compatible with an old device in a network.

In one embodiment, when the target field of the target packet carries the second eigenvalue or the frame gap before the target packet carries the second eigenvalue, and the target packet includes the feature field, it indicates that an ingress port used to receive the target packet supports a plurality of burst sequences. In this case, the packet forwarding device may use the feature field as the burst identifier of the burst sequence to which the target packet belongs, and obtain, based on the burst identifier, the egress port used to send the burst sequence.

Specifically, in one embodiment, if the packet forwarding device stores a correspondence that is between a burst identifier and port information and that is shared between all ingress ports, regardless of which ingress port the target packet is received from, when the packet forwarding device determines that the target packet includes the feature field, the packet forwarding device may search, based on only the feature field of the target packet, the correspondence for the port information corresponding to the burst identifier of the burst sequence to which the target packet belongs. In other words, the packet forwarding device may directly obtain, from the stored correspondence between the burst identifier and the port information, the port information corresponding to the burst identifier. The stored correspondence between the burst identifier and the port information is obtained by the packet forwarding device by storing, when receiving a header packet in each burst sequence, a feature field carried in the header packet and port information of an egress port of the header packet.

In another embodiment, if each ingress port of the packet forwarding device is corresponding to an independent correspondence, regardless of which ingress port the target packet is received from, after the packet forwarding device determines that the target packet includes the feature field, the packet forwarding device may search, by using the ingress port, the correspondence for the port information of the egress port corresponding to the burst identifier of the burst sequence to which the target packet belongs. In other words, in this case, the packet forwarding device may obtain, from a stored correspondence between ingress port information, a burst identifier, and egress port information, ingress port information of the target packet and the port information corresponding to the burst identifier. The stored correspondence between the ingress port information, the burst identifier, and the egress port information is obtained by the packet forwarding device by correspondingly storing, when receiving header packets of a plurality of burst sequences, ingress port information of an ingress port used to receive each header packet, a burst identifier carried in each header packet, and port information of an egress port used to send each header packet.

After obtaining the port information of the egress port used to send the burst sequence, the packet forwarding device may send the target packet through the egress port corresponding to the obtained port information. In one embodiment, before sending the target packet through the egress port corresponding to the obtained port information, the packet forwarding device may further clear an eigenvalue and/or the feature field carried in the target packet, re-mark the packet, and send the re-marked packet through the obtained egress port. In this case, for a next packet forwarding device, the current packet forwarding device is equivalent to the foregoing upstream device. For a specific marking method, refer to the foregoing method for marking a packet.

Operation 304: When there is no packet that carries a burst identifier of the burst sequence within preset duration, delete, from a correspondence between a burst identifier and port information, a record in which the burst identifier of the burst sequence and the port information of the egress port of the burst sequence are located.

Based on the foregoing descriptions, it may be learned that the feature field obtained by modifying a specific field in the target packet is used to represent the burst identifier, and a quantity of burst identifiers is limited. Therefore, if one burst identifier is occupied by one burst sequence for a long time, no burst identifier may be used for a subsequent packet in another burst sequence. Based on this, when the target packet is the header packet and the correspondence is established based on the target packet, or when the target packet is the following packet and the target packet is sent through the egress port corresponding to the port information in the stored correspondence, if there is no other to-be-sent packet that belongs to a same burst sequence as the target packet within the preset duration, in other words, there is no other to-be-sent packet that carries the burst identifier of the burst sequence within the preset duration, to release occupation of the burst identifier by the burst sequence so that a burst sequence that needs a burst identifier can subsequently use the burst identifier, the packet forwarding device may delete, from the correspondence between the burst identifier and the port information, the record in which the burst identifier of the burst sequence and the port information of the egress port of the burst sequence are located.

In this embodiment of the present disclosure, the packet forwarding device may determine whether the target packet is the following packet or the header packet in the burst sequence. If the target packet is the following packet in the burst sequence, the following packet is sent through the egress port of the burst sequence. Because the port information of the egress port of the burst sequence is determined and stored when the header packet in the burst sequence is sent, when sending the target packet, the target packet may be directly sent based on the stored egress port information, and there is no need to perform a complex action of looking up a routing table or looking up another forwarding table again based on the forwarding information carried in the target packet, thereby increasing a forwarding rate and reducing a forwarding delay.

Further, in this embodiment of the present disclosure, packets that belong to different burst sequences may further be distinguished by adding a burst identifier to a target packet. In this way, one port may simultaneously support sending of a plurality of burst sequences. In this case, for a header packet, the packet forwarding device may establish a correspondence between a burst identifier and port information based on a burst identifier in the header packet and port information of an egress port of the header packet. For a following packet, corresponding port information may be directly obtained from a correspondence, and the following packet is sent through an egress port corresponding to the port information. Because a quantity of burst identifiers is limited, a quantity of records in the correspondence between the burst identifier and the port information is far less than a quantity of entries in a conventional routing table or another forwarding table. In other words, an operation of searching, the correspondence by the packet forwarding device, for the egress port of the following packet is easier than an operation of looking up a forwarding table such as a routing table based on forwarding information of the following packet. This means that, according to the method provided in this embodiment of the present disclosure, efficiency of determining an egress port by the packet forwarding device and throughput efficiency may be effectively improved, and a forwarding delay may be effectively reduced.

It should be further noted that in related technologies, a case in which one port supports a plurality of burst sequences may also be implemented by dividing bandwidth of a physical port into several timeslots. However, because bandwidth of a divided timeslot is fixed, when a burst sequence cannot occupy a full timeslot, remaining bandwidth of the timeslot is wasted. However, when a packet is sent according to the packet sending method provided in the present disclosure, one port may simultaneously support a plurality of burst sequences by setting a burst identifier. In addition, because there is no fixed timeslot division, a problem that bandwidth is wasted does not exist. In other words, according to the packet sending method provided in the present disclosure, a forwarding delay is reduced, and bandwidth requirements of different services can be better adapted.

In the foregoing embodiment, the upstream device may mark a packet to distinguish between a header packet and a following packet, and may add a feature field to the packet as a burst identifier of a burst sequence to which the packet belongs, to distinguish between packets of different burst sequences. In this case, a downstream packet forwarding device may establish a correspondence in real time based on a burst identifier of the header packet. In another embodiment, a static correspondence table between a burst identifier and port information may be configured in the upstream device and the packet forwarding device, and the packet forwarding device may determine, based on the configured correspondence between the burst identifier and the port information, an egress port of a target packet that carries the burst identifier. Specifically, the following describes this implementation with reference to FIG. 4.

Figure 4:
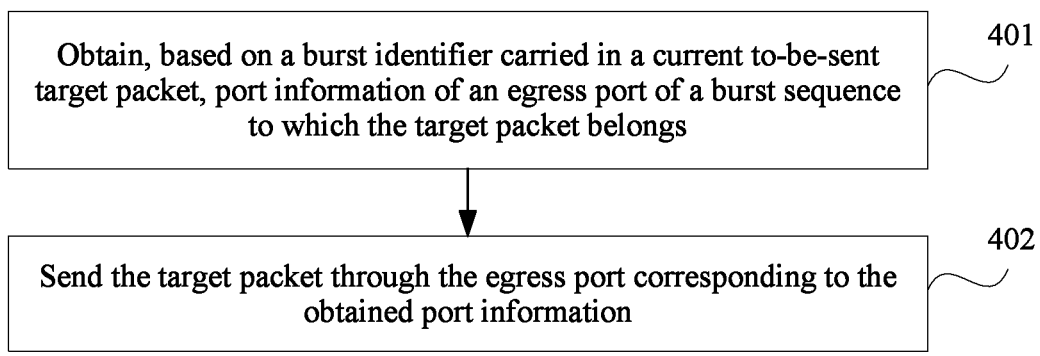
FIG. 4 is a flowchart of another packet forwarding method according to an embodiment of the present disclosure.

FIG. 4 is a flowchart of a packet forwarding method according to an embodiment of the present disclosure. As shown in FIG. 4, the method may be used in the packet forwarding device shown in FIG. 1, and the method includes the following operations.

Operation 401: Obtain, based on a burst identifier carried in a current to-be-sent target packet, port information of an egress port of a burst sequence to which the target packet belongs, where the burst sequence is a sequence including a plurality of packets that belong to a same service flow.

In this embodiment of the present disclosure, an upstream device of the packet forwarding device configures the burst identifier for the target packet based on a configured correspondence between a burst identifier and port information. The packet forwarding device may directly obtain, from the stored and preconfigured correspondence between the burst identifier and the port information based on the burst identifier of the target packet, the port information corresponding to the burst identifier. Alternatively, the packet forwarding device may obtain, from a stored and preconfigured correspondence between ingress port information, a burst identifier, and egress port information based on the burst identifier of the target packet, ingress port information of the target packet and the port information corresponding to the burst identifier.

It should be noted that in this embodiment of the present disclosure, a correspondence that is between a burst identifier and port information and that is used to determine an egress port of the target packet may be configured in the packet forwarding device, and certainly, burst identifiers separately corresponding to port information of an egress port of the packet forwarding device may be further configured in the packet forwarding device. To be specific, the packet forwarding device may first determine the egress port of the target packet based on the burst identifier carried in the target packet when the packet forwarding device receives the target packet, and then the packet forwarding device may change a burst identifier for a packet on each egress port for sending. The changed burst identifier is a burst identifier preconfigured for the egress port.

The burst identifier may be a feature field obtained by modifying a specific field in the target packet. For example, the feature field may be obtained by modifying any field in a preamble of the target packet, or the feature field may be obtained by modifying any field in a start-of-frame delimiter, or the feature field may be obtained by modifying any field in a frame check field.

Operation 402: Send the target packet through the egress port corresponding to the obtained port information.

In this embodiment of the present disclosure, a same burst identifier may be configured for a series of packets that have a same forwarding port, and the packet forwarding device may directly determine the egress port of the target packet based on the burst identifier carried in the packet. Because a quantity of burst identifiers is limited, the packet forwarding device determines the egress port of the target packet based on the burst identifier, so that an operation of looking up a complex routing table or another conventional forwarding table can be effectively avoided, thereby improving throughput efficiency of the packet forwarding device and reducing a forwarding delay.

It should be noted that the port mentioned in this embodiment of the present disclosure may be a physical port or may be a logical port. Specifically, each physical port may support sending of at least one burst sequence. With reference to the embodiments shown in FIG. 3C and FIG. 4, it can be learned that when each physical port supports sending of only one burst sequence, an upstream device that performs packet marking may mark a packet on a physical egress port on which the packet is sent to a downstream packet forwarding device. After determining a forwarding egress port of the packet, the downstream packet forwarding device may remark the packet on the forwarding egress port so that a downstream packet forwarding device of the packet forwarding device further forwards the packet based on an agreement and the mark, until a last packet forwarding device receives the packet, and the packet forwarding device may not mark the packet during forwarding, but directly delivers the packet in a conventional form to user equipment.

When each physical port may support sending of a plurality of burst sequences, a burst identifier may be introduced. A packet of each service flow is agreed on and allocated between an upstream device and a downstream device of different physical ports. Therefore, when service flows corresponding to a same burst sequence cross a network, a same burst identifier or different burst identifiers may be marked on each physical interface.

Figure 5A:
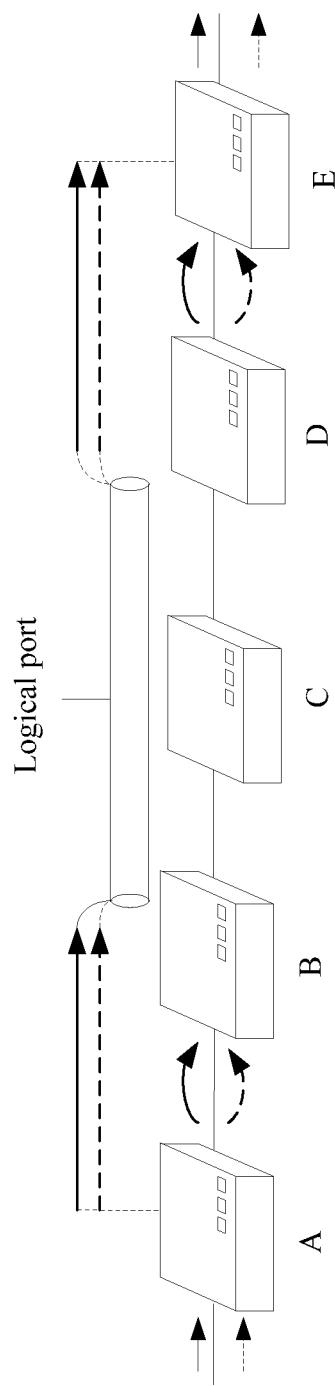
FIG. 5A is a schematic diagram in which a plurality of burst sequences share one logical port according to an embodiment of the present disclosure.

Further, the plurality of burst sequences may share not only one physical port, but also one logical port. The logical port may be one of a plurality of logical ports included in a physical port between two adjacent devices, or may be a network tunnel or a logical connection port that crosses one node or a plurality of nodes. FIG. 5A is a schematic diagram in which a plurality of burst sequences share one logical port according to an embodiment of the present disclosure. As shown in FIG. 5A, a device A may perform burst marking on a packet and send the packet. After receiving the packet, a device B forwards the packet to a device D through the logical port. When receiving the packet, the device D may forward and process the packet according to a packet in a burst sequence by using the method in the foregoing embodiment. As shown in FIG. 5A, the logical port is a network tunnel/pipeline that crosses a device C, and the node C performs cross connection for the tunnel/pipeline. In other words, the device C does not perform burst packet exchange and forwarding in a packet transmission process.

Figure 5B:
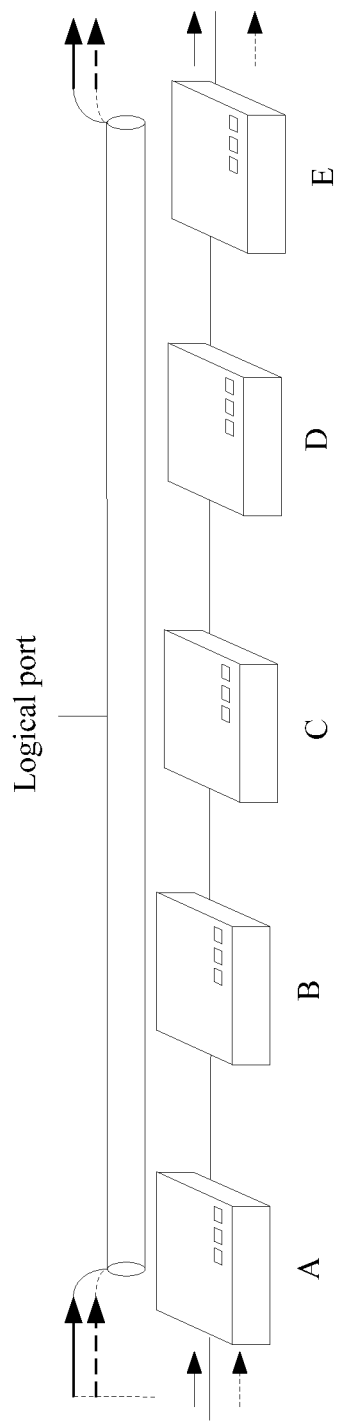
FIG. 5B is another schematic diagram in which a plurality of burst sequences share one logical port according to an embodiment of the present disclosure.

In one embodiment, as shown in FIG. 5B, a device A may perform burst marking on a received packet and send the received packet. The device A may send the packet in a burst sequence through a logical port. The logical port is a network tunnel/pipeline that crosses devices B, C, and D that serve as intermediate nodes. The packet in the burst sequence arrives at a device E through the network tunnel/pipeline. The device E receives the packet, and delivers, through a physical egress port, the packet to user equipment in a manner that is of forwarding a packet in a burst sequence and that is described in the foregoing embodiment. When the device E delivers the packet to the user equipment, the device E no longer marks the packet on the physical egress port. However, the devices B, C, and D do not forward and process the packet in the burst sequence in a packet transmission process. It should be noted that the device A may receive packets from different user equipments, and these packets may arrive at the device A through different physical ports. Certainly, the packets may also be from same user equipment, and arrive at the device A through a same physical port. When the device E delivers the packet to the user equipment, the device E may deliver the packet to one user equipment through one physical port, or may deliver the packet to different user equipments through different physical ports. For example, one user equipment sends packets of two service flows to the device A, and when the packets arrive at the device E, the device E may respectively send the packets of the two service flows to two user equipments.

In this embodiment of the present disclosure, a burst identifier is introduced, and a plurality of burst sequences may be transmitted through one logical port. In this way, a problem that a large quantity of pipelines are crossed at a core node because one service flow is corresponding to one rigid pipe in related technologies can be resolved, thereby improving forwarding efficiency of a device, and improving scalability of the device.

Figure 6:
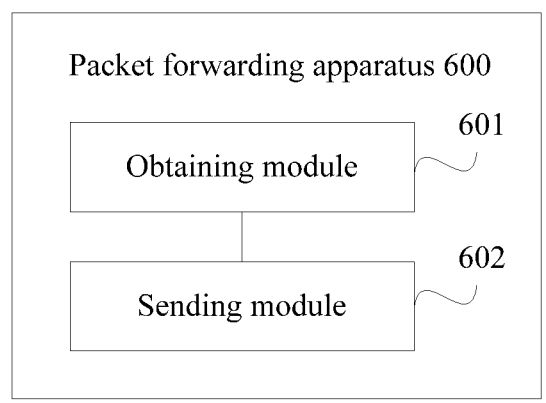
FIG. 6 is a schematic structural diagram of a packet forwarding apparatus according to an embodiment of the present disclosure.

Referring to FIG. 6, an embodiment of the present disclosure provides a packet forwarding apparatus 600, and the apparatus 600 includes:

an obtaining module 601, configured to perform operation 303 in the foregoing embodiments; and a sending module 602, configured to perform operation 304 in the foregoing embodiments.

In one embodiment, when a target field of the target packet carries a first eigenvalue, the target packet is the header packet in the burst sequence, and when the target field of the target packet carries a second eigenvalue, it is determined that the target packet is the following packet in the burst sequence.

Alternatively, when a frame gap that is received before the target packet and that is adjacent to the target packet carries a first eigenvalue, the target packet is the header packet in the burst sequence, and when a frame gap that is before and adjacent to the target packet carries a second eigenvalue, the target packet is the following packet in the burst sequence.

In one embodiment, the obtaining module 602 is specifically configured to:

when the target packet further includes a feature field, use the feature field as a burst identifier of the burst sequence, and obtain, from a stored correspondence between a burst identifier and port information, port information corresponding to the burst identifier, where the feature field is used to uniquely identify the burst sequence to which the packet in which the feature field is located belongs; and determine the obtained port information as the port information of the egress port used to send the burst sequence.

In one embodiment, the apparatus 600 further includes:

a determining module, configured to: when the target packet is the header packet in the burst sequence and the target packet further includes the feature field, determine an egress port of the target packet based on forwarding information carried in the target packet; and a storage module, configured to: use the feature field as the burst identifier of the burst sequence, and correspondingly store the burst identifier of the burst sequence and port information of the egress port of the target packet in the correspondence between the burst identifier and the port information.

In one embodiment, when the target field of the target packet carries a third eigenvalue, the target packet is the header packet in the burst sequence, and the third eigenvalue is used to indicate that the target packet is the header packet in the burst sequence and instruct to update the stored correspondence between the burst identifier and the egress port.

The apparatus is further configured to:

determine an egress port of the target packet based on forwarding information carried in the target packet; and when the target packet further includes the feature field, use the feature field as the burst identifier of the burst sequence, and replace the port information corresponding to the burst identifier in the correspondence between the burst identifier and the port information with port information of the egress port of the target packet.

In one embodiment, the apparatus 600 further includes:

a deletion module, configured to: when there is no packet that carries the burst identifier of the burst sequence within preset duration, delete, from the correspondence between the burst identifier and the port information, a record in which the burst identifier of the burst sequence and the port information of the egress port of the burst sequence are located.

In one embodiment, the target field is any field in a preamble, or the target field is any field in a start-of-frame delimiter, or the target field is any field in a frame check field.

In one embodiment, the feature field and the target field are different fields, the feature field is obtained by modifying any field in a preamble, or the feature field is obtained by modifying any field in a start-of-frame delimiter, or the feature field is obtained by modifying any field in a frame check field.

In conclusion, in this embodiment of the present disclosure, the packet forwarding device may determine whether the target packet is the following packet or the header packet in the burst sequence. If the target packet is the following packet in the burst sequence, the egress port of the burst sequence is obtained to send the following packet. Because the egress port of the burst sequence is determined and stored when the header packet in the burst sequence is sent, when sending the target packet, the target packet may be directly sent through the stored egress port, and there is no need to perform a complex action of looking up a routing table or looking up another forwarding table again based on the forwarding information carried in the target packet, thereby increasing a forwarding rate and reducing a forwarding delay.

Figure 7:
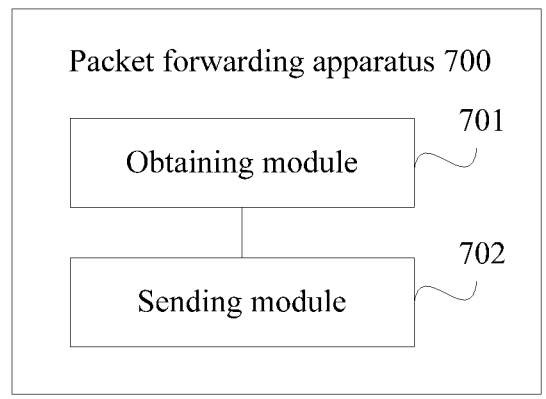
FIG. 7 is a schematic structural diagram of another packet forwarding apparatus according to an embodiment of the present disclosure.

Referring to FIG. 7, an embodiment of the present disclosure provides a packet forwarding apparatus 600, and the apparatus 600 includes:

an obtaining module 701, configured to perform operation 401 in the foregoing embodiments;

a sending module 702, configured to perform operation 402 in the foregoing embodiments.

In one embodiment, the obtaining module 701 is specifically configured to:

when the target packet includes a feature field, use the feature field as a burst identifier of the burst sequence to which the target packet belongs, and obtain, from a stored correspondence between a burst identifier and port information, port information corresponding to the burst identifier, or obtain, from a stored correspondence between ingress port information, a burst identifier, and egress port information, ingress port information of the target packet and port information corresponding to the burst identifier; and determine the obtained port information as the port information of the egress port of the burst sequence.

In this embodiment of the present disclosure, a same burst identifier may be configured for a series of packets that have a same forwarding port, and a packet forwarding device may directly determine an egress port of the target packet based on the burst identifier carried in the packet. Because a quantity of burst identifiers is limited, the packet forwarding device determines the egress port of the target packet based on the burst identifier, so that an operation of looking up a complex routing table or another conventional forwarding table can be effectively avoided, thereby improving throughput efficiency of the packet forwarding device and reducing a forwarding delay.

It should be noted that division of the foregoing function modules is only described as an example during packet forwarding by the packet forwarding apparatus provided in the foregoing embodiments. In actual application, the foregoing functions may be allocated, based on a requirement, to be implemented by different function modules, to be specific, an internal structure of the device is divided into different function modules to implement all or some of the functions described above. In addition, the packet forwarding apparatus provided in the foregoing embodiments is based on a same inventive concept as the embodiments illustrating the packet forwarding method. For a specific implementation process, refer to the method embodiments. Details are not repeatedly described herein.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer instructions are loaded and executed on the computer, the procedures or functions according to the embodiments of the present disclosure are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD), or the like.

A person of ordinary skill in the art may understand that all or some of the operations of the embodiments may be implemented by hardware or a program instructing related hardware. The program may be stored in a computer readable storage medium. The storage medium may include a read-only memory, a magnetic disk, an optical disc, or the like.

The foregoing descriptions are embodiments provided in the present disclosure, but are not intended to limit the present disclosure. Any modification, equivalent replacement, or improvement made without departing from the spirit and principle of the present disclosure should fall within the protection scope of the present disclosure.

What is claimed is:

1. A packet forwarding method, comprising:
   determining whether a to-be-sent target packet is a header packet or a following packet in a burst sequence based on different target field eigenvalues;
   when the to-be-sent target packet is the following packet in the burst sequence, obtaining port information of an egress port used to send the burst sequence, wherein the port information of the egress port is determined and stored when the header packet in the burst sequence is sent, and the burst sequence is a sequence comprising a plurality of packets that belong to a same service flow; and
   sending the target packet through the egress port corresponding to the obtained port information.

2. The method according to claim 1, wherein when a target field of the target packet carries a first eigenvalue, the target packet is the header packet in the burst sequence, and when the target field of the target packet carries a second eigenvalue, the target packet is the following packet in the burst sequence; or
   when a frame gap that is received before the target packet and that is adjacent to the target packet carries the first eigenvalue, the target packet is the header packet in the burst sequence, and when the frame gap that is before and adjacent to the target packet carries the second eigenvalue, the target packet is the following packet in the burst sequence, wherein a field in the frame gap before the target packet is modifiable to indicate whether the target packet is the header packet or the following packet in the burst sequence by using the different target field eigenvalues.

3. The method according to claim 1, wherein the obtaining port information of the egress port used to send the burst sequence comprises:
   when the target packet further comprises a feature field, using the feature field as a burst identifier of the burst sequence, and obtaining, from a stored correspondence between the burst identifier and port information, port information corresponding to the burst identifier, wherein the feature field is used to uniquely identify the burst sequence to which the target packet in which the feature field is located belongs; and
   determining the obtained port information as the port information of the egress port used to send the burst sequence.

4. The method according to claim 3, further comprising:
   when a target packet is the header packet in the burst sequence and the target packet further comprises the feature field, determining the egress port of the target packet based on forwarding information carried in the target packet; and
   using the feature field as the burst identifier of the burst sequence, and correspondingly storing the burst identifier of the burst sequence and port information of the egress port of the target packet in the correspondence between the burst identifier and the port information.

5. The method according to claim 4, wherein when a target field of the target packet carries a third eigenvalue, the target packet is the header packet in the burst sequence, and the third eigenvalue is used to indicate that the target packet is the header packet in the burst sequence and instruct to update the stored correspondence between the burst identifier and the port information; and
   the method further comprises:
   when the target packet is the header packet in the burst sequence, determining the egress port of the target packet based on forwarding information carried in the target packet; and
   when the target packet further comprises the feature field, using the feature field as the burst identifier of the burst sequence, and replacing the port information corresponding to the burst identifier in the correspondence between the burst identifier and the port information with port information of the egress port of the target packet.

6. The method according to claim 3, further comprising:
   when there is no packet that carries the burst identifier of the burst sequence within preset duration, deleting, from the correspondence between the burst identifier and the port information, a record in which the burst identifier of the burst sequence and the port information of the egress port of the burst sequence are located.

7. The method according to claim 2, wherein the target field is any field in a preamble, or the target field is any field in a start-of-frame delimiter, or the target field is any field in a frame check field.

8. The method according to claim 3, wherein the feature field and the target field are different fields, the feature field is obtained by modifying any field in a preamble, or the feature field is obtained by modifying any field in a start-of-frame delimiter, or the feature field is obtained by modifying any field in a frame check field.

9. The method of claim 3, comprising:
   obtaining, based on the burst identifier carried in the to-be-sent target packet, port information of the egress port of the burst sequence to which the target packet belongs, wherein the burst sequence is the sequence comprising the plurality of packets that belong to a same service flow; and
   sending the target packet through the egress port corresponding to the obtained port information.

10. The method according to claim 9, wherein the obtaining, based on the burst identifier carried in the to-be-sent target packet, port information of the egress port of the burst sequence to which the target packet belongs comprises:
    when the target packet comprises the feature field, using the feature field as the burst identifier of the burst sequence to which the target packet belongs, and obtaining, from a stored correspondence between the burst identifier and port information, port information corresponding to the burst identifier, or obtaining, from a stored correspondence between ingress port information, the burst identifier, and egress port information, ingress port information of the target packet and port information corresponding to the burst identifier; and determining the obtained port information as the port information of the egress port of the burst sequence.

11. The method according to claim 9, wherein the egress port of the burst sequence is a physical port or a logical port.

12. A packet forwarding apparatus, comprising:

an obtaining module, configured to: determine whether a to-be-sent target packet is a header packet or a following packet in a burst sequence based on different target field eigenvalues, when the to-be-sent target packet is the following packet in the burst sequence, obtain port information of an egress port used to send the burst sequence, wherein the port information of the egress port is determined and stored when the header packet in the burst sequence is sent, and the burst sequence is a sequence comprising a plurality of packets that belong to a same service flow; and a sending module, configured to send the target packet through the egress port corresponding to the obtained port information.

13. The apparatus according to claim 12, wherein when a target field of the target packet carries a first eigenvalue, the target packet is the header packet in the burst sequence, and when the target field of the target packet carries a second eigenvalue, the target packet is the following packet in the burst sequence; or when a frame gap that is received before the target packet and that is adjacent to the target packet carries the first eigenvalue, the target packet is the header packet in the burst sequence, and when the frame gap that is before and adjacent to the target packet carries the second eigenvalue, the target packet is the following packet in the burst sequence, wherein a field in the frame gap before the target packet is modifiable to indicate whether the target packet is the header packet or the following packet in the burst sequence by using the different target field eigenvalues.

14. The apparatus according to claim 12, wherein the obtaining module is further configured to:

when the target packet further comprises a feature field, use the feature field as a burst identifier of the burst sequence, and obtain, from a stored correspondence between the burst identifier and port information, port information corresponding to the burst identifier, wherein the feature field is used to uniquely identify the burst sequence to which the target packet in which the feature field is located belongs; and determine the obtained port information as the port information of the egress port used to send the burst sequence.

15. The apparatus according to claim 14, further comprising:

a determining module, configured to: when the target packet is the header packet in the burst sequence and the target packet further comprises the feature field, determine the egress port of the target packet based on forwarding information carried in the target packet; and a storage module, configured to: use the feature field as the burst identifier of the burst sequence, and correspondingly store the burst identifier of the burst sequence and port information of the egress port of the target packet in the correspondence between the burst identifier and the port information.

16. The apparatus according to claim 15, wherein when a target field of the target packet carries a third eigenvalue, the target packet is the header packet in the burst sequence, and the third eigenvalue is used to indicate that the target packet is the header packet in the burst sequence and instruct to update the stored correspondence between the burst identifier and the port information; and the apparatus is further configured to:

determine the egress port of the target packet based on forwarding information carried in the target packet; and when the target packet further comprises the feature field, use the feature field as the burst identifier of the burst sequence, and replace the port information corresponding to the burst identifier in the correspondence between the burst identifier and the port information with port information of the egress port of the target packet.

17. The apparatus according to claim 14, further comprising:

a deletion module, configured to: when there is no packet that carries the burst identifier of the burst sequence within preset duration, delete, from the correspondence between the burst identifier and the port information, a record in which the burst identifier of the burst sequence and the port information of the egress port of the burst sequence are located.

18. The apparatus according to claim 13, wherein the target field is any field in a preamble, or the target field is any field in a start-of-frame delimiter, or the target field is any field in a frame check field.

19. The apparatus according to claim 14, wherein the feature field and the target field are different fields, the feature field is obtained by modifying any field in a preamble, or the feature field is obtained by modifying any field in a start-of-frame delimiter, or the feature field is obtained by modifying any field in a frame check field.

20. A non-transitory machine-readable storage medium having instructions stored therein, which when executed by a processor, cause the processor to perform operations, the operations comprising:

determining whether a to-be-sent target packet is a header packet or a following packet in a burst sequence based on different target field eigenvalues;

when the to-be-sent target packet is the following packet in the burst sequence, obtaining port information of an egress port used to send the burst sequence, wherein the port information of the egress port is determined and stored when the header packet in the burst sequence is sent, and the burst sequence is a sequence comprising a plurality of packets that belong to a same service flow; and sending the target packet through the egress port corresponding to the obtained port information.

* * * * *

UNITED STATES PATENT AND TRADEMARK OFFICE
CERTIFICATE OF CORRECTION

| | |
|---|---|
| PATENT NO. | : 11,277,339 B2 |
| APPLICATION NO. | : 16/809996 |
| DATED | : March 15, 2022 |
| INVENTOR(S) | : Zhong et al. |

It is certified that error appears in the above-identified patent and that said Letters Patent is hereby corrected as shown below:

On the Title Page

Item (63) in the Related U.S. Application Data, delete "PCT/CN/2018/014083" and insert --PCT/CN2018/104083--.

In the Claims

In Claim 4, Column 28, Line 2, delete "when a target packet" and insert --when the target packet--.

Signed and Sealed this
Fourteenth Day of June, 2022

*Katherine Kelly Vidal*

Katherine Kelly Vidal
*Director of the United States Patent and Trademark Office*